United States Patent
Nathan et al.

(10) Patent No.: US 12,545,610 B2
(45) Date of Patent: Feb. 10, 2026

(54) METHOD AND SYSTEM FOR WASTEWATER TREATMENT

(71) Applicant: FLUENCE WATER PRODUCTS AND INNOVATION LTD, Caesarea (IL)

(72) Inventors: Neri Nathan, Ein Ha-Horesh (IL); Ronen Itzhak Shechter, Tel Aviv (IL)

(73) Assignee: FLUENCE WATER PRODUCTS AND INNOVATION LTD., Caesarea (IL)

( * ) Notice: Subject to any disclaimer, the term of this patent is extended or adjusted under 35 U.S.C. 154(b) by 394 days.

(21) Appl. No.: 18/023,084

(22) PCT Filed: Sep. 19, 2021

(86) PCT No.: PCT/IL2021/051137
§ 371 (c)(1),
(2) Date: Feb. 24, 2023

(87) PCT Pub. No.: WO2022/064485
PCT Pub. Date: Mar. 31, 2022

(65) Prior Publication Data
US 2023/0312384 A1  Oct. 5, 2023

Related U.S. Application Data (60) Provisional application No. 63/082,590, filed on Sep. 24, 2020.

(51) Int. Cl.
*C02F 9/00* (2023.01)
*C02F 1/66* (2023.01)
(Continued)

(52) U.S. Cl.
CPC ............. *C02F 9/00* (2013.01); *C02F 3/006* (2013.01); *C02F 1/66* (2013.01); *C02F 3/208* (2013.01);
(Continued)

(58) Field of Classification Search
CPC .. C02F 3/302; C02F 9/00; C02F 3/006; C02F 1/66; C02F 3/208; C02F 3/307;
(Continued)

(56) References Cited

U.S. PATENT DOCUMENTS 6,645,374 B2   11/2003   Cote et al.
7,175,763 B2   2/2007    Husain et al.
(Continued)

FOREIGN PATENT DOCUMENTS

CN   1532151 A   *   9/2004
JP   2002-224688 A   8/2002
(Continued)

OTHER PUBLICATIONS

Sumino et al. JP 2006320831, English machine translation, pp. 1-12 (Year: 2006).*
(Continued)

*Primary Examiner* — Claire A Norris
(74) *Attorney, Agent, or Firm* — Oliff PLC (57) ABSTRACT

A wastewater treatment method comprising splitting wastewater influent into a first influent stream and second influent stream; subjecting the first influent stream to treatment within at least one membrane aerated biofilm reactor (MABR) to provide a MABR effluent; subjecting the second influent stream and said MABR effluent to treatment within an anaerobic ammonium oxidation (Anammox) reactor to obtain treated water effluent; and discharging from said Anammox reactor said treated water effluent. Also provided is a wastewater treatment system comprising at least one
(Continued)

membrane aerated biofilm reactor (MABR) module; an anaerobic ammonium oxidation (Anammox) reactor comprising at least one inlet and an outlet for discharging treated water effluent; and a wastewater influent arrangement configured for splitting a wastewater influent to a first influent stream and a second influent stream and for supplying said first influent stream to said MABR module and said second influent stream to said Anammox reactor.

5 Claims, 3 Drawing Sheets

(51) Int. Cl.
  *C02F 3/00* (2023.01)
  *C02F 3/20* (2023.01)
  *C02F 3/30* (2023.01)
(52) U.S. Cl.
  CPC ........ *C02F 3/307* (2013.01); *C02F 2201/005* (2013.01); *C02F 2209/06* (2013.01); *C02F 2209/14* (2013.01); *C02F 2209/40* (2013.01)
(58) Field of Classification Search
  CPC ............ C02F 2201/005; C02F 2209/06; C02F 2209/14; C02F 2209/15; C02F 2209/40; C02F 2301/043
  USPC ........................................................ 210/607
  See application file for complete search history.

(56) References Cited

U.S. PATENT DOCUMENTS 10,662,099 B2   5/2020   Cote et al.
2005/0211629 A1   9/2005   Isaka et al.
2006/0283796 A1   12/2006   Tokutomi
2013/0264280 A1   10/2013   Zhao et al.

FOREIGN PATENT DOCUMENTS

| JP | 2005-246135 A | 9/2005 | |
|---|---|---|---|
| JP | 2005-329399 A | 12/2005 | |
| JP | 2006320831 A * | 11/2006 | ............ C02F 3/2806 |
| WO | 2011/073977 A1 | 6/2011 | |
| WO | 2016/038606 A1 | 3/2016 | |
| WO | WO-2019216906 A1 * | 11/2019 | .............. C02F 3/006 |

OTHER PUBLICATIONS

Isaka et al, CN 1532151, English machine translation, pp. 1-6 (Year: 2004).*

Henze, M., van Loosdrecht, M. C., Ekama, G. A., & Brdjanovic, D. (Eds.). (2008), Biological wastewater treatment, IWA publishing, pp. 146-152.

Sunja Cho, Cicilia Kambey and Van Khanh Nguyen, Performance of Anammox Processes for Wastewater Treatment: A Critical Review on Effects of Operational Conditions and Environmental Stresses Water 2020, 12, 20; doi:20.3390/w12020020.

C. Hellinga, A. A. J. C. Schellen, J. W. Mulder, M. C. M. van Loosdrecht, J. J. Heijnen; The SHARON process: an Innovative method for nitrogen removal from ammonium-rich waste water. Water Sci Technol May 1, 1998; 37 (9): 135-142. doi: https://doi.org/20.2166/wst.1998.0350.

Van Dongen, Water Science and Technology: vol. 44 No. 1 pp. 153-160 © IWA Publishing 2001.

* cited by examiner

METHOD AND SYSTEM FOR WASTEWATER TREATMENT

TECHNOLOGICAL FIELD

The present disclosure relates to water treatment.

BACKGROUND ART

References considered to be relevant as background to the presently disclosed subject matter are listed below:
[1] International Patent application Publication No. WO 2016038606
[2] U.S. Pat. No. 7,175,763
[3] U.S. Pat. No. 6,645,374
[4] International Patent application Publication No. WO 2011073977
[5] Henze, M., van Loosdrecht, M. C., Ekama, G. A., & Brdjanovic, D. (Eds.). (2008). Biological wastewater treatment. IWA publishing, pp 146-152
[6] Sunja Cho, Cicilia Kambey and Van Khanh Nguyen, Performance of Anammox Processes for Wastewater Treatment: A Critical Review on Effects of Operational Conditions and Environmental Stresses Water 2020, 12, 20; doi: 20.3390/w12020020
[7] C. Hellinga, A. A. J. C. Schellen, J. W. Mulder, M. C. M. van Loosdrecht, J. J. Heijnen; The SHARON process: an innovative method for nitrogen removal from ammonium-rich waste water. Water Sci Technol 1 May 1998; 37 (9): 135-142. doi: https://doi.org/20.2166/wst.1998.0350

Acknowledgement of the above references herein is not to be inferred as meaning that these are in any way relevant to the patentability of the presently disclosed subject matter.

BACKGROUND

Different processes have been proposed for wastewater treatment in recent years, one of them includes Membrane Aerated Biofilm Reactor (MABR) [1], [2], [3], [4]. In MABR oxygen for ammonia oxidation is supplied via a gas permeable, self-respiring membrane, on which an autotrophic nitrifying biofilm can be manipulated to develop, such as by holding a sufficient concentration of mixed liquor suspended solids (MLSS). In the MABR, ammonia undergoes a nitrification and denitrification according to the following chemical equations (1a) and (1b):

$$2NH_4^+ + 3O_2 \rightarrow 2NO_2^- + 2H^+ + H_2O \quad (1a)$$

$$2NO_2^- + 0.5\ O_2 \rightarrow NO_3^- \quad (1b)$$

Other processes include Anammox (ANerobic AMMonia OXidation) which is an anaerobic autotrophic de-ammonification process based on anammox bacteria. It requires nitrite and ammonia at a molar ratio of about 1:1 to perform the biological reaction described by the following simplified chemical equation (2) which excludes metabolic uptake of reactants:

$$NH_4^+ + NO_2^- \rightarrow N_2 + 2H_2O \quad (2)$$

Some advantages of using anammox for nitrogen removal from wastewater relate to its low energy consumption due to need to only oxidize part of the ammonia nitrogen and due to oxidation to nitrite instead of oxidation to nitrate in alternative conventional nitrification-denitrification. Additionally, relative to conventional nitrification-denitrification processes, anammox does not require addition of an external electron donor such as bio-degradable organic material (BOD), which reduces operating costs and carbon emissions [5] [6].

It was suggested to use the Anammox process in combination with a partial nitrification process (SHARON process) is used for the treatment of ammonium rich wastewater, like sludge digester effluent. The SHARON reactor is used to provide the entire feed for the Anammox process with 50% of the ammonium being converted to nitrite, with the aim of providing a 50:50 mixture of ammonium and nitrite as feed to the Anammox reactor. [7].

GENERAL DESCRIPTION

The present disclosure provides in accordance with a first of its aspects a method for wastewater treatment, the method comprising
  splitting wastewater influent into a first influent stream and a second influent stream;
  subjecting the first influent stream to treatment within at least one membrane aerated biofilm reactor (MABR) to provide a MABR effluent;
  subjecting the second influent stream and said MABR effluent to treatment within an anaerobic ammonium oxidation (Anammox) reactor to obtain treated water effluent; and
  discharging from said Anammox reactor said treated water effluent.

Also provided by the present disclosure is a system for wastewater treatment, the system comprises
  at least one membrane aerated biofilm reactor (MABR) module;
  an anaerobic ammonium oxidation (Anammox) reactor comprising at least one inlet and an outlet for discharging treated water effluent; and
  a wastewater influent arrangement configured for splitting a wastewater influent to a first influent stream and a second influent stream and for supplying said first influent stream to said MABR module and said second influent stream to said Anammox reactor.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

The present disclosure is based on the realization that to improve annamox processes, there is a need to balance the amount of nitrite and ammonia within the reactor to be at about the same concentration in molar terms or in terms of nitrogen mass concentration. Hitherto, attempts have been made to control the nitrite and ammonia proportions included control of pH, temperature (affecting the activity of ammonium oxidizing bacteria (AOB) and nitrite oxidizing bacteria (NOB)), and amount of BOD in the reactor that may cause partial or complete loss of anammox microbiological population dominance.

To achieve the desired balance, the inventors have envisaged that there would be an advantage to a priori treat a portion of the water influent to increase nitrite concentration being introduced into the Anammox reactor and that this can be achieved by the use of an upstream membrane aerated biofilm reactor (MABR). In MABR, ammonia is mostly oxidized to nitrite ($NO_2^-$) and only a small part of the ammonia is oxidized to nitrate ($NO_3^-$). One of the conditions to inhibit nitrite conversion to nitrate relates to the nitrite concentration. High nitrite concentration, especially at low pH, inhibits NOB and thus inhibits the conversion of nitrite into nitrate. Further, when considering the common operating ranges for pH in biochemical wastewater treatment processes, which is typically being between about 6.0 and about 9.0, lower end of these pH values will ensure a higher nitrite fraction in the discharged treated water.

The discharged nitrite concentration (in terms of nitrogen units, i.e. $NO_2$—N) in an MABR module is several folds higher than ammonia or nitrate. For the sake of illustration, in a MABR module operated at 600 mg/l ammonia concentration in the influent (feed), the MABR discharged treated water typically contains about 90 mg/l ammoniacal nitrogen ($NH_4$—N), about 60 mg/l nitrate nitrogen ($NO_3$—N) and about 450 mg/l nitrite-nitrogen ($NO_2$—N).

Further, the present disclosure is based on the fact that in MABR the ammonia oxidation rate increases with ammonia concentration and this concentration would typically be equal to the effluent concentration in an MABR structured as a continuous-stirred-tank-reactor (CSTR), until a certain concentration above which the rate remains constant. Such conditions are referred to hereinafter as "saturation concentration" or "saturation rate". In this context, it is optimal that the MABR operates above the ammonia saturation concentration therein.

Thus, the present disclosure aims at, inter alia, providing an improved method and system for wastewater treatment that provides control over nitrite to ammonia ratio within anammox reactors, while in some cases, being independent on pH, temperature or other factors. Thus, treatment of part of the influent within the MABR prior to Anammox treatment exempts from the need to control the pH and/or temperature within the entire treatment process, and in particular, in the anammox reactor or similar anaerobic ammonium oxidation reactor, where there is a need for an equimolar ratio between the ammonia and nitrite in the reactor. The disclosed improved method and system involves integration of at least one MABR module with an Anammox rector module.

Specifically, the present disclosure provides, in accordance with its first aspect, a wastewater treatment method comprising
  splitting wastewater influent into a first influent stream and a second influent stream;
  subjecting the first influent stream to treatment within a membrane aerated biofilm reactor (MABR) module to provide a MABR effluent;
  subjecting the second influent stream and the MABR effluent to treatment within an anaerobic ammonium oxidation (Anammox) reactor to obtain treated water effluent; and
  discharging from the Anammox reactor treated water effluent.

Further disclosed herein, in accordance with a second with its aspect is a wastewater treatment system comprising
  a membrane aerated biofilm reactor (MABR) module;
  an anaerobic ammonium oxidation (Anammox) reactor comprising at least one AR inlet for receiving MABR effluent from the MABR module and an outlet for discharging treated water effluent; and
  a wastewater influent arrangement configured for splitting a wastewater influent to a first influent stream and a second influent stream and for supplying the first influent stream to the MABR module and the second influent stream to the Anammox reactor.

In the context of the present disclosure, when referring to wastewater it is to be understood to refer to any source or type of water than that is not suitable for human consumption and in some examples needs at least removal of ammonia/nitrogen containing compounds therefrom. The wastewater can be domestic wastewater, industrial wastewater, sludge, contaminated natural water sources etc.

Further, in the context of the present disclosure, when referring to treated water or treated water effluent it is to be understood to refer to water being discharged from at least the Anammox reactor and having an amount/concentration of nitrogen containing compounds that is lower than the concentration thereof in the influent. By the term "lower" it is typically understood to refer to at least 50% lower, at times, at least 70% lower, at times, 80% lower.

The method and system disclosed herein are based on the realization that there is a benefit in providing an essentially equimolar ratio between ammonia and nitrite in an anammox reactor. As explained above, having an equimolar ratio improves the efficiency of anammox treatment of the wastewater and extent of production of gaseous nitrogen and water. Further, as explained above, the improvement is achieved, inter alia, by a priori subjecting part of the wastewater influent to membrane aerobic treatment using a membrane aerated biofilm reactor (MABR) module that increases the concentration of nitrite entering the Anammox reactor.

Specifically, in the MABR module, ammonia is mostly oxidized to nitrite ($NO_2^-$) and only a small part is oxidized to nitrate ($NO_3^-$). One of the conditions for biochemical nitritation over nitrification of ammonia compounds in wastewater, is a high nitrite concentration in the reactor, more preferably at a low pH value. A high nitrite concentration in the MABR effluent would be a concentration higher than about 100 mg/l and preferably higher than 200 mg/l.

For illustration, a MABR operated at 600 mg/l ammonia concentration in the wastewater influent (feed) will typically discharge treated water with about 90 mg/l ammonia (in terms of $NH_4$—N), about 60 mg/l nitrate (in terms of $NO_3$—N) and about 450 mg/l nitrite (in terms of $NO_2$—N).

Thus, treatment of at least part of the wastewater influent by the MABR allows for increasing the nitrite concentration in the wastewater when the concentration thereof is not sufficient or lower than the concentration of ammonia (in terms of nitrogen concentration).

In some examples, the wastewater influent is spilt such that a first wastewater stream/flow enters the MABR to provide MABR effluent (being enriched with nitrite as compared to the nitrite concentration in the wastewater influent). The MABR effluent can be combined with the second influent stream prior to entering the Anammox reactor or the MABR effluent and the second influent stream can be separately introduced into the Anammox reactor, e.g. via two dedicated/separate Anammox reactor inlets.

In some examples, the proportion between the first influent stream and the second influent stream, in other words, the fraction of the first influent stream out of the total wastewater influent stream, can be determined based on ammonia concentration in the wastewater influent, e.g. determined by a dedicated chemical sensor configured for sensing ammonia concentration in the influent.

In some examples, the proportion between the first influent stream and the second influent stream (i.e. the fraction of the first influent stream) can be determined based on ammonia concentration in the MABR effluent, e.g. determined by a dedicated chemical sensor configured for sensing ammonia concentration in the MABR effluent.

In some examples, the proportion between the first influent stream and the second influent stream (the fraction of the first influent stream) can be determined based on nitrite concentration in the MABR effluent, e.g. determined by a dedicated chemical sensor configured for sensing nitrite concentration in the MABR effluent.

In some examples, the proportion between the first influent stream and the second influent stream (i.e. the fraction of the first influent stream) can be determined based on nitrate concentration in the MABR effluent, e.g. determined by a dedicated chemical sensor configured for sensing nitrate concentration in the MABR effluent.

In some examples, the proportion between the first influent stream and the second influent stream (i.e. the fraction of the first influent stream) can be determined based on ammonia concentration in the wastewater influent and at least one of ammonia concentration, nitrite concentration and nitrate concentration in the MABR effluent.

In some examples, the proportion between the first influent stream and the second influent stream (i.e. the fraction of the first influent stream) can be determined based on ammonia concentration in the wastewater influent and ammonia concentration, nitrite concentration and nitrate concentration in the MABR effluent.

The fraction of the first influent stream can be controlled using a dedicated pump or a controllable valve that can be switched between an open position and a closed position, e.g. under an open configuration, wastewater influent is directed to the MABR.

In some examples, the fraction of the first influent is determined and controlled based on the following equation (3):

$$y = x/((1+w)(x-z)) \quad (3)$$

where:
y represents the fraction of the first influent out of the total influent stream;
X represents ammonia concentration in the wastewater influent
w represents fraction of nitrite concentration in MABR effluent out of a combined concentration of nitrite and nitrate in said MABR effluent; and
Z represents ammonia concentration in MABR effluent.

It is noted that in the context of the present disclosure when referring to concentration of any of the mentioned N-containing compounds, namely ammonia, nitrite and nitrate, it is to be understood to mean concentration in terms of nitrogen. In this connection, when referring to concentration in terms of nitrogen it is to be understood to refer to the weight nitrogen per volume. Accordingly, for example, 1 mg/l of $NH_3$—N (ammonia nitrogen) is oxidized to produce 1 mg/l of $NO_3$—N(nitrate nitrogen).

The fraction of the first influent stream (for example, its flowrate) can vary in time, e.g. based on the concentration of the N-containing compounds, namely, the ammonia, nitrite and nitrate in the influent and effluent. The variation can be, for example, a diurnal variation or seasonal variation.

The treatment method can be controlled using a control unit (controller). In some examples, the control unit comprises a processor utility (processor) and a user interface utility. The processor utility is pre-programed to collect measured data from the different chemical sensors and the different flow meters and to carry out data analysis according to equation (3) above.

In some examples, the control unit processes data indicative of the concentration of ammonia in the influent and ammonia, nitrate and nitrite in the MABR effluent and based thereon actuates a pump and/or the influent valve to manipulate the rate of first influent stream flowing into the MABR.

In some examples, the data is continuously collected. In some other examples, the data is periodically collected.

Similarly, the control unit can continuously control the state/position of the valve between and open or partially open position and a closed position and/or the activity of the pump (pumping the first and/or the second influent), or, in some other examples, the control unit can periodically adapt the state of the valve and/or operation of a pump.

In some examples, the control unit can provide information via the user interface utility for a user to manually operate the valve and/or pump.

In some examples, the fraction of the first influent stream being directed to the MABR module is manipulated to provide an essentially equimolar ratio of ammonia and nitrite entering into the Anammox reactor.

In the context of the present disclosure, when referring to an essentially equimolar ratio it is to be understood that the molar ratio between the ammonia and the nitrite is about 1:1, but possibly also any molar ratio between about 1.2:1 and 1:1.2. In some examples, the fraction of the first influent is controlled to provide an equimolar ratio between the ammonia and nitrite in the Anammox reactor.

In some examples, the disclosed method comprises controlling the fraction of the first influent whereby at least 50% of the wastewater influent is directed to the MABR module. In some examples, the method comprises controlling the fraction of the first influent to so as to direct between 50% and 70% of the wastewater influent to the MABR module.

In some examples, the fraction of the first influent streaming into the MABR module is greater than the fraction of the second influent streaming into the AR module.

In some examples, the method comprises directing a fraction of the influent to the MABR module when ammonia concentration in the wastewater influent is above 200 mg/l; at times, above 300 mg/l.

In some examples, promoting nitritation over nitrification is achieved by controlling the pH of the influent entering the MABR (i.e. of the first influent stream). This can be achieved, for example, by manipulating the alkalinity of the wastewater. In some examples, the manipulation of alkalinity comprises increasing the alkalinity, e.g. by feeding the first wastewater influent with a base such as, without being limited thereto, sodium hydroxide (caustic soda), sodium carbonate (soda Ash), magnesium hydroxide and others.

The MABR treatment results in oxidation of most of the ammonia compounds to nitrite (typically with a small part being oxidized to nitrate). The nitrite rich MABR effluent is then fed into the Anammox reactor.

Treatment in the Anammox reactor results conversion of essentially all ammonia and nitrite to gaseous nitrogen ($N_2$) which eventually leaves the treated water effluent according to equation (1) above.

The treated water effluent can be subjected to further treatments as known in the wastewater treatment industry. This includes, for example aerobic biological treatment, aeration, filtration, chemical oxidation and others.

As appreciated, the method disclosed herein can include additional wastewater treatment processes, which may be incorporated in the disclosed methods as pre-treatment steps, i.e. processes applied onto the wastewater influent before being split into a first influent stream and a second influent stream, and/or as intermediate processing steps, e.g. between the MABR treatment and the Anammox treatment and/or post Anammox treatment.

In some cases, the additional treatment steps comprise removal of solids. In some examples, solid removal can be achieved by the use of Anammox subsystems for solid removal/separation or classification therein (e.g. to discharge solids that would be suitable biomass for other processes, while retaining solids that are more suitable for anammox treatment, i.e. as anammox biomass).

The present disclosure also provides a wastewater treatment system; the system comprises a priori a MABR module and an Anammox reactor, the latter comprising at least one AR inlet for receiving MABR effluent from said MABR module and an outlet for discharging treated water effluent. In addition, the system comprises at least a wastewater influent arrangement configured for splitting wastewater influent into a first wastewater influent stream and a second wastewater influent stream and for supplying the first wastewater influent stream to the MABR module and the second wastewater influent stream to the Anammox reactor.

In some examples, the influent arrangement comprises a splitter for splitting a main influent line that receives and communicates the wastewater from wastewater source, into a first influent line and a second influent line. The first influent line communicates the first influent stream into the MABR module and the second influent line communicates the second influent stream into the Anammox reactor.

In some examples, the system comprises at least one chemical sensor for detecting at least one of ammonia, nitrite and nitrate. In some examples, the chemical sensor is configured to sense concentration of at least one ammonia in the wastewater influent stream. The chemical sensor for determining ammonia concentration in the influent can be positioned at any location along the main influent line, the first influent line and/or the second influent line.

In some examples, the system comprises at least one additional chemical sensor between the MABR module and the Anammox reactor. The at least one additional chemical sensor is configured for sensing at least one of, at least two of or at least all of nitrite concentration, ammonia concentration and nitrate concentration in the MABR effluent.

In some examples, the at least one additional chemical sensor is configured for sensing at least nitrite concentration in the MABR effluent.

In some examples, the at least one additional chemical sensor is configured for sensing at least ammonia concentration in the MABR effluent.

In some examples, the at least one additional chemical sensor is configured for sensing the combined concentration of nitrite and nitrate in the MABR effluent.

In some examples, the system comprises an influent valve that is of a type that can be switched between an open position, a partially open position and a closed position so as to manipulate the flow of the first influent stream into the MABR.

In some examples, the valve is located along the first influent line and when in open position it allows flow of wastewater influent into the MABR module and to the Anammox rector; yet, when in closed position, it allows flow of wastewater influent into the Anammox reactor only.

In some other examples, the valve is located along one of the first influent line and the second influent line; when the valve is in open position it allows flow of influent to both the MABR and to the Anammox reactor; yet, when in closed position, it allows flow of influent to one of the MABR or anammox reactor only.

The switchable valve can also be configured to control the fraction of influent being directed to the MABR and/or Anammox reactor, e.g. by controlling the percent of opening of the valve.

In some examples, the system also comprises one or more flow meters. In some examples, a flow meter is configured to receive data on influent flow rate and to communicate said data to a control unit.

In some examples, the flow meter is located along the influent line, typically along the main influent line, i.e. before the split.

In some examples, a flow meter is positioned after the splitting of the influent.

In some examples, the flow meter is located between the MABR module and the Anammox reactor.

In some examples, the system comprises a control unit. As described above with reference to the method disclosed herein (which also applies to the system), the control unit includes, inter alia, a processing utility (processor) and a user interface utility. The processing utility is pre-programed to collect measured data from the different chemical sensors and the different flow meters and to carry out data analysis according to equation (3) above.

The system disclosed herein can also comprise a pH meter configured for measuring pH of at least wastewater influent. The pH meter can be connectable to the control unit such that once the pH of the influent is outside a desired range, e.g. below 6.0, the data indicative of the pH, as measured by the pH meter is processed by the processing utility within the control unit and an output is provided. The output can include instruction for manipulating alkalinity of the influent. To this end, the system can also comprise or be connectable to an alkalinity source and the control unit is pre-programed to feed the first wastewater influent with chemicals such as carbonate salts, without being limited thereto, sodium bi carbonate, sodium carbonate (soda Ash), and others, so as to increase the alkalinity of the influent within the MABR module.

In some examples, the system also comprises one or more pumps for controlling flow of the first and/or second influent stream.

In some examples, the system also comprises one or more water treatment subsystems, such as a subsystem configured for removing solids from at least the anammox reactor.

Figure 1:
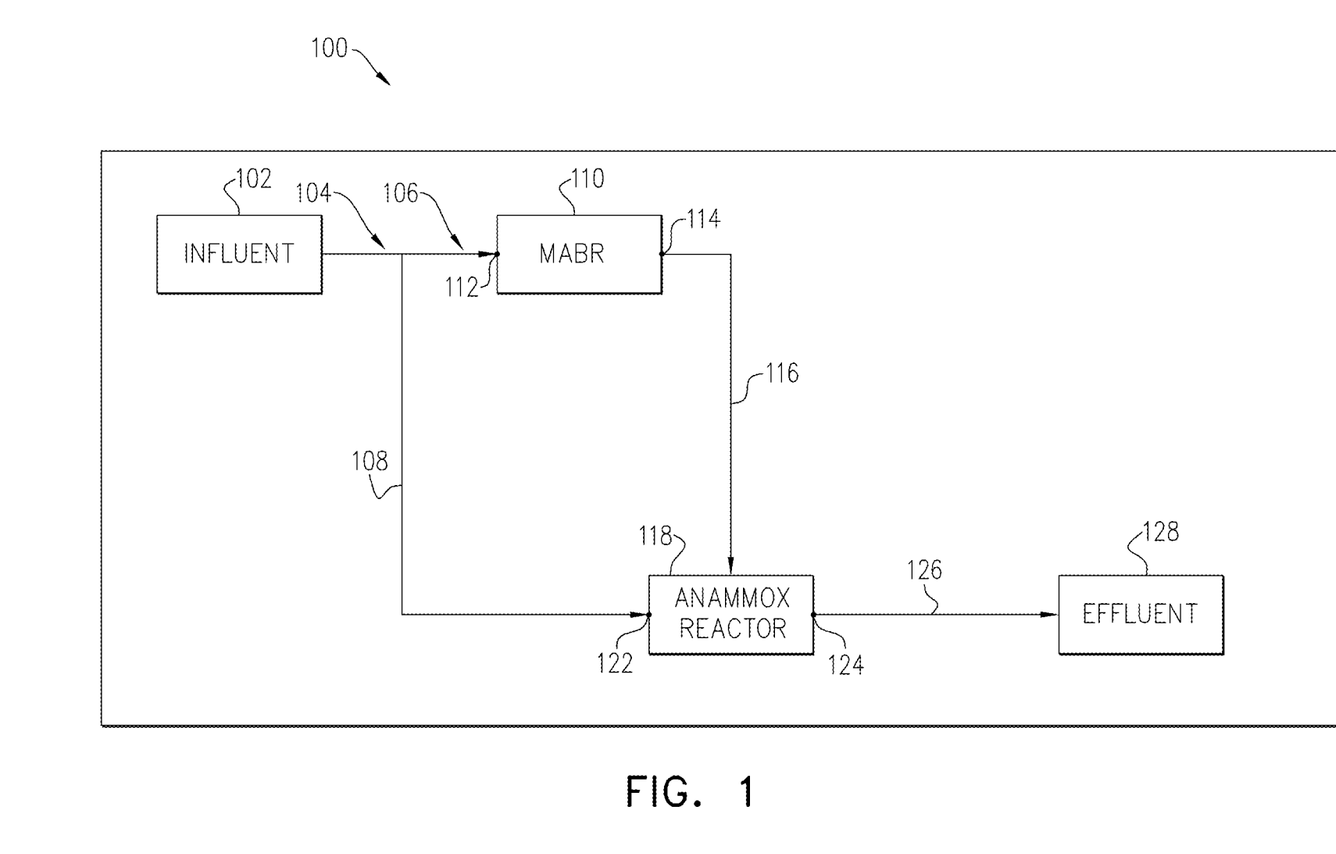
FIG. 1 is schematic illustration of wastewater treatment system in accordance with one non-limiting example of the present disclosure.

Reference is now made to FIG. 1 providing an exemplary wastewater treatment system according to the present disclosure.

Specifically, FIG. 1 schematically illustrates a wastewater treatment system 100 comprising a wastewater influent source 102 directing wastewater influent into a wastewater influent arrangement 104 being split into a stream of a first influent 106 and to a stream of a second influent 108. System 100 also comprises a membrane aerated biofilm reactor (MABR) module 110 including a MABR inlet 112 for receiving the first influent 106 and a MABR outlet 114 for discharging MABR effluent 116; and an anaerobic ammonium oxidation (Anammox) reactor 118 comprising a first Anammox inlet 120 for receiving MABR effluent from MABR outlet 114, and a second Anammox inlet 122 for receiving the stream of second influent 108. The Anammox reactor 118 also comprises a treated water outlet 124 for discharging treated water effluent 126 for downstream processing subsystems 128 and/or for ultimate discharge and collecting (not shown).

Anammox reactor 118 can comprise additional subsystems, e.g. for solids separations and/or classifications (not illustrated).

Figure 2:
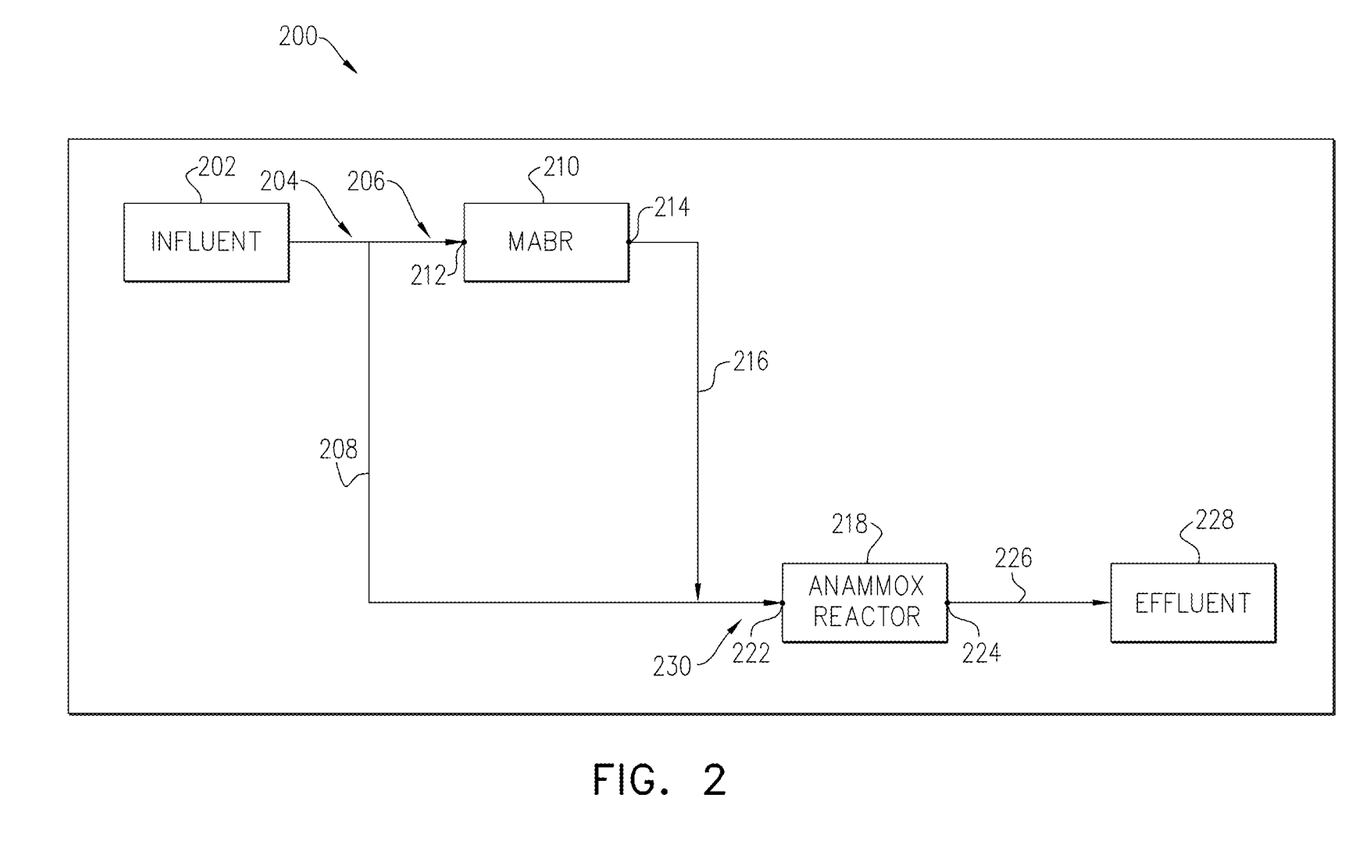
FIG. 2 is schematic illustration of wastewater treatment system in accordance with another non-limiting example of the present disclosure.

Turning now to FIG. 2, which provides a schematic illustration of another wastewater treatment system in accordance with the present disclosure.

For simplicity, like reference numerals to those used in FIG. 1, shifted by 100 are used to identify components having a similar function. For example, component 210 in FIG. 2 is a MABR module having the same function as MABR module 110 in FIG. 1.

Specifically, FIG. 2 provides a wastewater treatment system 200 comprising a wastewater influent source 202 directing wastewater influent into a wastewater influent arrangement 204 which is split into a stream of a first influent 206 and to a stream of a second influent 208.

System 200 also comprises a membrane aerated biofilm reactor (MABR) module 210 including a MABR inlet 212 for receiving the first influent 206 and a MABR outlet 214 for discharging MABR effluent 216; and an anaerobic ammonium oxidation (Anammox) reactor 218.

In wastewater treatment system 200, the stream of MABR effluent and the second influent converge into a mixed feeding line 230, the convergence allowing the mixing of the MABR effluent and the second influent to form a modified influent being introduced into Anammox reactor 218 via Anammox inlet 222.

Figure 3:
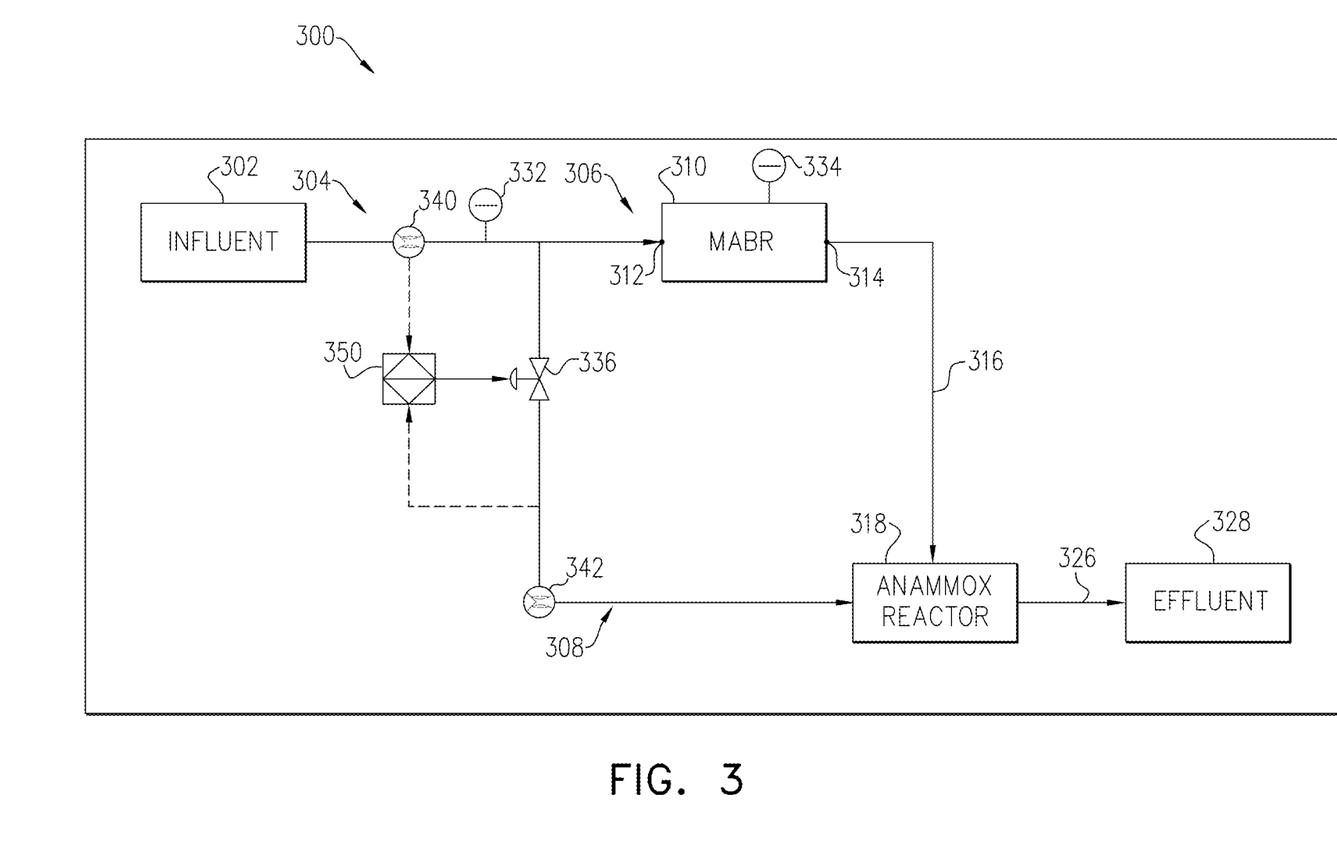
FIG. 3 is schematic illustration of wastewater treatment system in accordance with yet another non-limiting example of the present disclosure.

Turning now to FIG. 3, which provides a schematic illustration of yet another wastewater treatment system in accordance with the present disclosure.

For simplicity, like reference numerals to those used in FIG. 1, shifted by 200 are used to identify components having a similar function. For example, component 310 in FIG. 3 is a MABR module having the same function as MABR module 110 in FIG. 1.

Specifically, FIG. 3 provides a wastewater treatment system 300 comprising a wastewater influent source 302 directing wastewater influent into a wastewater influent arrangement 304 which is split into a stream of a first influent 306 and to a stream of a second influent 308.

System 300 also comprises a membrane aerated biofilm reactor (MABR) module 310 including a MABR inlet 312 for receiving the first influent 306 and a MABR outlet 314 for discharging MABR effluent 316; and an anaerobic ammonium oxidation (Anammox) reactor 318.

Wastewater treatment system 300 also include at least one sensor 332 along the wastewater influent 304 and at least one additional sensor 334 within the MABR module 310. Sensor 332 is preferably, although no exclusively, selected to sense ammonia concentration in the wastewater influent, i.e. before entering the MABR module and/or Anammox reactor. Sensor 334 is preferably, although no exclusively, selected to sense nitrite concentration and optionally also nitrate concentration in the MABR module.

Wastewater treatment system 300 also include a switchable valve 336 along the wastewater influent arrangement 304, and in this particular example, along the second influent line 308.

Switchable valve 336 is controllable switched between an open position, whereby influent flows into MABR module 310 and into Anammox reactor 318 or closed position, whereby influent flows only into MABR module 310. Switchable valve 336 can also control flow rate of second influent, e.g. by controlling the percent of opening of the valve.

Switchable valve 336 can be closed when there is a need to enrich the influent entering Anammox reactor 318 with nitrite and open or partially open, when the molar ratio between the ammonia and nitrite in the wastewater influent is essentially or close to 1:1.

Wastewater treatment system 300 also includes a flow meter, such as flow meter 340 along the influent arrangement, typically before the split. An additional flow meter can be located in other locations along the system, such as along the second influent line 308, illustrated as flow meter 342. Flow meter 340 and flow meter 342 detect flow of influent in the respective influent lines and transmit data indicative of current flow rate to a control unit 350 comprising at least a processing utility and a user interface (not illustrated).

Control unit 350 is connectable to the one or more chemical sensors and one or more flow meters for collecting and analyzing the measured data to determine the portion of the influent that needs to be directed to the MABR module and to activate the switchable valve according to the determination. As described herein, the portion being directed to the MABR is determined using equation (3), provided hereinabove.

The control unit 350 has a data processing and analyzing utility operable to analyze the sensed N-containing compounds' concentrations and the flow rate of the liquid and determine the portion of influent to be directed to the MABR module. In this connection it is noted that control unit 350 is configured to handle a constant flow rate as well as a variable flow rate, such as diurnal variation or seasonal variation. The flow rate can vary using a dedicated pump (not shown).

Control unit 350 is connectable to each component in the system, e.g. chemical sensors and/or flow meters via wires or wirelessly. The control unit 350 may be a separate computer device, or integral processor utility of system 300.

Control unit 350 is configured to received data indicative of at least ammonia concentration received from chemical sensor 332 and nitrite concentration and nitrate concentration from chemical sensor 334; and configured for changing position of switchable valve 336 so as to provide an equimolar ratio of nitrite and ammonia in Annamox reactor 318.

As used herein, the forms "a", "an" and "the" include singular as well as plural references unless the context clearly dictates otherwise. For example, the term "MABR module" includes one or more AMBR modules which can work in parallel or in sequence, and provide MABR treated effluent to the downstream Anammox reactor.

Further, as used herein, the term "comprising" is intended to mean that the system and method include the recited components and/or steps, e.g. the MABR module and Anammox reactor, but not excluding other elements, such as other processing subsystem(s) and method steps for performing water treatment. The term "consisting essentially of" is used to define a system or method which include the recited components but exclude other components that may have an essential significance on treatment of water. "Consisting of" shall thus mean excluding elements that have any affect on the performance of the system and/or method. Embodiments defined by each of these transition terms are within the scope of this invention.

Further, all numerical values, e.g. when referring the amounts or ranges of the elements constituting the system or method, are approximations which are varied (+) or (−) by up to 20%, at times by up to 10% of from the stated values. It is to be understood, even if not always explicitly stated that all numerical designations are preceded by the term "about".

The invention will now be exemplified in the following non-limiting numerical example. It is to be understood that this example is intended to be in the nature of illustration rather than of limitation. Obviously, many modifications and variations of the example are possible in light of the above teaching. It is therefore, to be understood that within the scope of the appended claims, the invention may be practiced otherwise, in a myriad of possible ways, than as specifically described hereinbelow.

Non-Limiting Example

NH$_4$—N concentration in MABR effluent: 200 mg/l
Ratio between nitrite (NO$_2^-$) and nitrate (NO$_3^-$) in MABR effluent: 0.9
Required NO$_2^-$/NH$_4^+$ molar at Anammox Reactor inlet 1
Based on NH4-N concentration in MABR effluent, Table 1 provides the values of y, x, w and z in equation (3):

$$y = \frac{x}{(1+w)(x-z)} \quad (3)$$

y—Fraction of the total flow that is passed through the MABR before entering the Anammox reactor;
x—Influent NH$_4$—N concentration (mg/l)
w—MABR Effluent NO$_2$—N/NO$_3$—N concentration ratio
z—MABR effluent NH$_4$—N concentration (mg/l)

Table 2 provides a calculation example of the portions being directed to Anammox reactor and respective portion directed to MABR for different influent ammonia concentrations and for the following constant conditions presented in Table 1.

TABLE 1

| MABR effluent parameters | |
|---|---|
| NH$_4$ concentration in MABR effluent | 200 mg/l |
| Nitrite fraction of combined nitrite (NO$_2$-) and nitrate (NO$_3$-) in the MABR effluent | 0.9 |
| Required ratio between NO$_2$ and NH$_4$ at the inlet to the anammox reactor | 1 |

TABLE 2 flow split ratios between MABR and anammox reactors

| Influent NH$_4$-N (mg/l) | Flow to ANMX (%) | Flow to MABR (%) |
|---|---|---|
| 400 | 29.8 | 70.2 |
| 500 | 34.2 | 65.8 |
| 600 | 36.8 | 63.2 |
| 700 | 38.6 | 61.4 |

TABLE 2-continued flow split ratios between MABR and anammox reactors

| Influent NH$_4$-N (mg/l) | Flow to ANMX (%) | Flow to MABR (%) |
|---|---|---|
| 800 | 39.8 | 60.2 |
| 900 | 40.8 | 59.2 |
| 1000 | 41.5 | 58.5 |
| 2000 | 44.6 | 55.4 |

The invention claimed is:

1. A wastewater treatment method comprising splitting wastewater influent into a first influent stream and a second influent stream;
   subjecting the first influent stream to treatment within at least one membrane aerated biofilm reactor (MABR) to provide a MABR effluent;
   subjecting the second influent stream and said MABR effluent to treatment within an anaerobic ammonium oxidation (Anammox) reactor to obtain treated water effluent; and
   discharging from said Anammox reactor said treated water effluent,
   wherein said method further comprises comprising controlling flow rate of said first influent in accordance with equation (3):

$$y = \frac{x}{(1+w)(x-z)} \quad (3)$$

where:
   y represents fraction of first influent stream;
   x represents influent ammonia concentration
   w represents ratio between nitrite concentration in MABR effluent and combined concentrations of nitrite and nitrate in said MABR effluent; and
   z represents ammonia concentration in MABR effluent.

2. The wastewater treatment method of claim 1, wherein said second influent flow and said MABR effluent are combined prior to being treated within the Anammox reactor.

3. The wastewater treatment method of claim 1, wherein said second influent flow and said MABR effluent are combined within the Anammox reactor.

4. The wastewater treatment method of claim 1, comprising controlling flow of said first influent by operating a valve to regulate the flow of one of the first influent stream or second influent stream.

5. The wastewater treatment method of claim 1, comprising any one or combination of the following:
   controlling the pH of said first influent to a value that promotes nitritation over nitrification;
   internal circulating MABR effluent into said MABR;
   increasing alkalinity of the wastewater influent;
   removing solids from at least said anammox reactor; and
   processing discharged treated water effluent.

* * * * *